(12) United States Patent
Kayashima et al.

(10) Patent No.: US 7,269,418 B2
(45) Date of Patent: Sep. 11, 2007

(54) WIRELESS COMMUNICATION APPARATUS

(75) Inventors: Naoshi Kayashima, Yokohama (JP); Yuuji Nagano, Yokohama (JP); Yuji Nomura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 494 days.

(21) Appl. No.: 10/953,125

(22) Filed: Sep. 29, 2004

(65) Prior Publication Data

US 2005/0197116 A1 Sep. 8, 2005

(30) Foreign Application Priority Data

Mar. 4, 2004 (JP) ............................. 2004-060141

(51) Int. Cl.
*H04Q 7/20* (2006.01)
*H04M 1/66* (2006.01)
*H04M 1/00* (2006.01)
*H04B 7/00* (2006.01)
*H04B 1/38* (2006.01)
*H04B 1/26* (2006.01)

(52) U.S. Cl. .................. 455/432.2; 455/410; 455/411; 455/432.3; 455/41.2; 455/556.2; 455/550.1; 455/561; 370/328

(58) Field of Classification Search .. 455/426.1–426.2, 455/410–411, 403, 415, 422.1, 432.2, 432.3, 455/433–434, 435.1, 435.2, 41.2–41.3, 515–517, 455/524, 550.1, 552.1, 554.1–554.2, 556.2, 455/560–561, 553.1; 370/310, 328, 395.52, 370/395.53, 338
See application file for complete search history.

(56) References Cited

U.S. PATENT DOCUMENTS

| | | | |
|---|---|---|---|
| 7,016,334 B2 * | 3/2006 | Cohen et al. | 370/338 |
| 7,197,035 B2 * | 3/2007 | Asano | 370/392 |
| 2002/0122410 A1 * | 9/2002 | Kulikov et al. | 370/349 |
| 2004/0081150 A1 * | 4/2004 | Chiang et al. | 370/392 |

FOREIGN PATENT DOCUMENTS

JP 2001-111544 4/2001

\* cited by examiner

*Primary Examiner*—Meless Zewdu
(74) *Attorney, Agent, or Firm*—Katten Muchin Rosenman LLP

(57) ABSTRACT

A wireless communication apparatus capable of preventing data leakage in wireless communication. A transmitted data frame receiver receives a transmitted data frame which is transmitted from a terminal to the wireless communication apparatus. An address information converter converts the address information of the terminal included in the transmitted data frame, into the address information of the own wireless communication apparatus. A radio transmitter transmits the transmitted data frame by radio. An address information comparator compares the address information included in a received data frame received by a radio receiver, with the address information of wireless communication apparatuses being stored in an address information memory. A received data frame destruction unit destructs the received data frame depending on the comparison result.

6 Claims, 10 Drawing Sheets

11 CONVERSION TABLE

| AP MANAGEMENT NUMBER | MAC ADDRESS | PORT NUMBER |
|---|---|---|
| pa1 | MAC_A | PA1 |
| pa2 | MAC_A | PA2 |
| pb1 | MAC_B | PB1 |
| pb2 | MAC_B | PB2 |
| pc1 | MAC_C | PC1 |
| pd1 | MAC_D | PD1 |
| pd2 | MAC_D | PD2 |
| pd3 | MAC_D | PD3 |
| pd4 | MAC_D | PD4 |
| pe1 | MAC_E | PE1 |
| pe2 | MAC_E | PE2 |
| pf1 | MAC_F | PF1 |

FIG. 6

| | |
|---|---|
| SOURCE MAC ADDRESS | MAC_A |
| DESTINATION MAC ADDRESS | MAC_D |
| SOURCE PORT NUMBER | PA1 |
| DESTINATION PORT NUMBER | PD1 |

PORT NUMBERS AND MAC
ADDRESSES BEFORE CONVERSION

FIG. 8A

| | |
|---|---|
| SOURCE MAC ADDRESS | AP1 |
| DESTINATION MAC ADDRESS | AP2 |
| SOURCE PORT NUMBER | pa1 |
| DESTINATION PORT NUMBER | pd1 |

PORT NUMBERS AND MAC
ADDRESSES AFTER CONVERSION

FIG. 8B

| SOURCE MAC ADDRESS | AP1 |
|---|---|
| DESTINATION MAC ADDRESS | AP2 |
| SOURCE PORT NUMBER | pa1 |
| DESTINATION PORT NUMBER | pd1 |

PORT NUMBERS AND MAC ADDRESSES BEFORE CONVERSION

FIG. 10A

| SOURCE MAC ADDRESS | MAC_A |
|---|---|
| DESTINATION MAC ADDRESS | MAC_D |
| SOURCE PORT NUMBER | PA1 |
| DESTINATION PORT NUMBER | PD1 |

PORT NUMBERS AND MAC ADDRESSES AFTER CONVERSION

FIG. 10B

WIRELESS COMMUNICATION APPARATUS

CROSS-REFERENCE TO RELATED APPLICATIONS

This application is based upon and claims priority of Japanese Patent Application No. 2004-060141, filed on Mar. 4, 2004, the contents being incorporated herein by reference.

BACKGROUND OF THE INVENTION (1) Field of the Invention

This invention relates to a wireless communication apparatus and, more particularly, to a wireless communication apparatus for connecting a plurality of wired networks with wireless communication.

(2) Description of the Related Art

Recently there has been growing data communication between electronic devices in wireless Local Area Networks (LAN). The wireless LAN communication system is setup with an adhoc network, an infrastructure network, and/or a wireless distribution system. The ad hoc network is a peer-to-peer connection of only wireless terminals. The infrastructure network is one in which one access point and terminals constitute a wireless network and a plurality of access points are linked by wired connection. The wireless distribution system is a wireless LAN connection of access points.

If a wired connection cannot be established as a LAN connection between two office buildings, both the infrastructure network and the wireless distribution system may be used (hereinafter, this is referred to as a combined technique). By using this technique, the wired LANs of the two office buildings can be connected with a wireless LAN.

The combined technique uses access points to link wired LAN networks by a wireless connection, the wired LAN networks each composed of terminals such as personal computers. Terminals on the different wired LANs can communicate with each other via the terminal access points of the wired LANs.

In wireless communication, third parties can intercept communication. In case of interception of communication, data should be made confidential with encryption before transmission. Wireless LANs ensure security with the Wired Equivalent Privacy (WEP) encryption technology which is defined by IEEE802.11.

To offer secured data communication over the infrastructure network, an authentication method in a wireless LAN has been proposed, in which the Media Access Control (MAC) addresses of client terminals are stored in an authentication server and when a terminal requests an access point for authentication, the access point sends the authentication server the terminal's MAC address information to make the authentication server perform the authentication process (for example, refer to Japanese Unexamined Patent 2001-111544 (Paragraph [0027]-[0033], FIG. 1).

The WEP encryption technology, however, allows a third party to successively intercept encrypted data and assume an encryption key being used in the communication area of the wireless LAN from the data. That is, this technology has a data leakage problem.

SUMMARY OF THE INVENTION

This invention has been made in view of foregoing, and intends to provide a wireless communication apparatus which accepts only data from wireless communication apparatuses with which wireless communication can be established, thus avoiding access from third parties and preventing data leakage.

To accomplish the above problem, there provided is a wireless communication apparatus for connecting a plurality of wired networks with wireless communication. This wireless communication apparatus comprises: an address information memory for storing the address information of other wireless communication apparatuses with which wireless communication can be established; a transmitted data frame receiver for receiving a transmitted data frame from a terminal on one of the plurality of wired networks being linked by a wired connection; an address information converter for converting the address information of the terminal included in the transmitted data frame to the address information of the own wireless communication apparatus; a radio transmitter for transmitting the transmitted data frame by radio; a radio receiver for receiving a radio signal from one of the other wireless communication apparatuses; an address information comparator for comparing the address information of the one of the other wireless communication apparatuses included in the received data frame of the radio signal, with the address information being stored in the address information memory; and a received data frame destruction unit for destructing the received data frame depending on the comparison result of the address information comparator.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 shows a structure of a conversion table;

FIGS. 8A and 8B are port numbers and MAC addresses before and after conversion which is executed as shown in FIG. 7;

FIGS. 10A and 10B are port numbers and MAC addresses before and after conversion which is executed as shown in FIG. 9.

DESCRIPTION OF THE PREFERRED EMBODIMENTS

The principle of the present invention will be hereinafter described with reference to FIG. 1.

Figure 1:
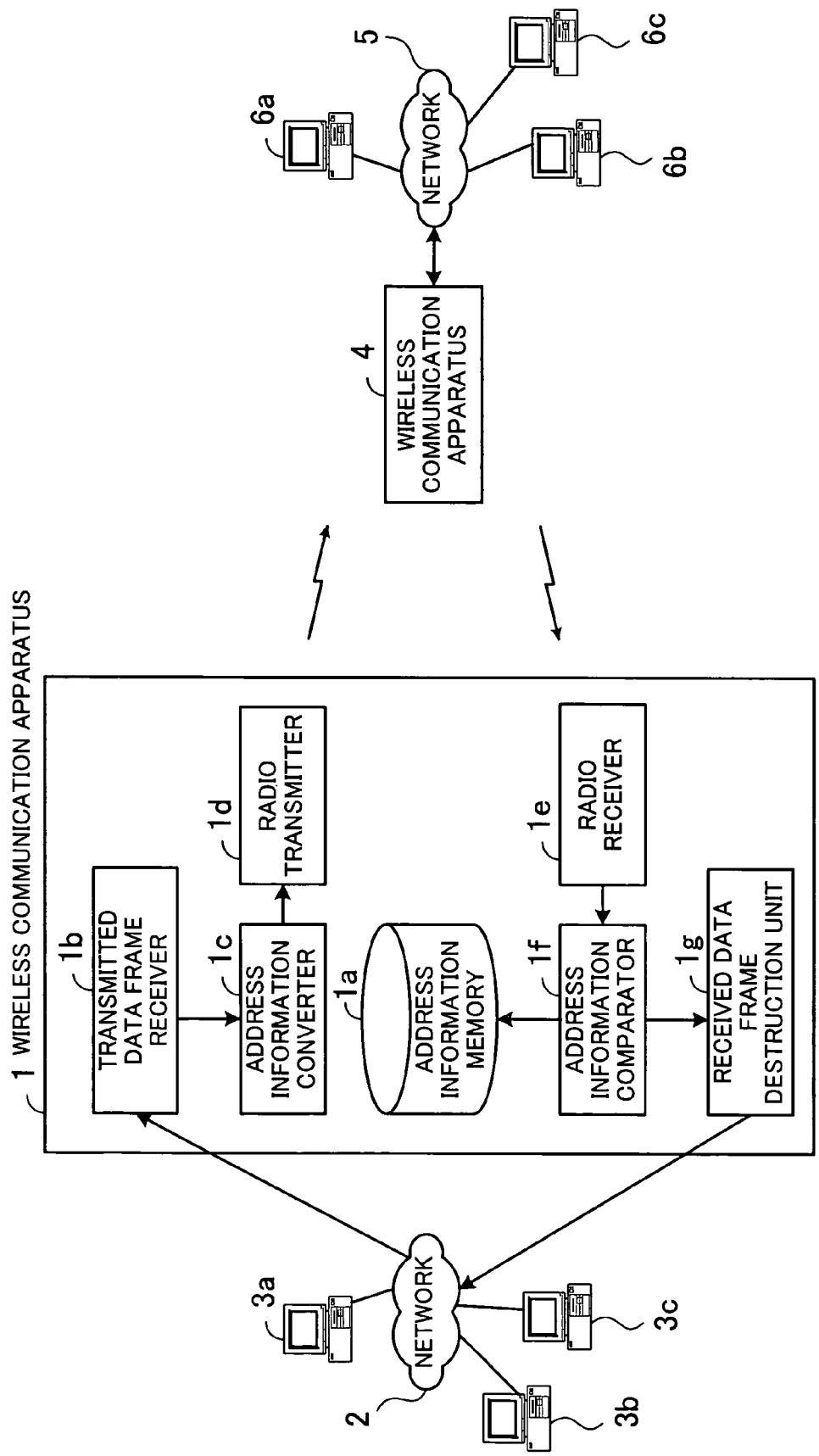
FIG. 1 shows a principle of the present invention.

Referring to FIG. 1, terminals 3a to 3c and a wireless communication apparatus 1 are connected to a wired network 2. Terminals 6a to 6c and a wireless communication apparatus 4 are connected to a wired network 5. These wireless communication apparatuses 1 and 4 connect the networks 2 and 5 with wireless communication.

The wireless communication apparatus 1 is composed of an address information memory 1a, a transmitted data frame receiver 1b, an address information converter 1c, a radio transmitter 1d, a radio receiver 1e, an address information comparator 1f, and a received data frame destruction unit 1g.

The address information memory 1a stores the address information of other wireless communication apparatuses with which wireless communication can be established. The address information are Media Access Control (MAC) addresses, for example. Now assume that the wireless communication apparatus 4 is one of such wireless communication apparatuses and has the same construction as the wireless communication apparatus 1.

The transmitted data frame receiver 1b receives a transmitted data frame from a terminal 3a to 3c on the network 2 being linked by a wired connection.

The address information converter 1c converts the address information of the terminal 3a to 3c included in the transmitted data frame, which has been received by the transmitted data frame receiver 1b, into the address information of the own wireless communication apparatus 1.

The radio transmitter 1d transmits by radio the transmitted data frame having the changed address information.

The radio receiver 1e receives a radio signal from another wireless communication apparatus 4.

The address information comparator 1f compares the address information of the wireless communication apparatus 4 included in the received data frame of the radio signal, with the address information being stored in the address information memory 1a.

The received data frame destruction unit 1g destructs the received data frame depending on the comparison result of the address information comparator 1f. Specifically, this destruction unit 1g destructs the received data frame when the address information included in the received data frame of the radio signal does not match the address information of the wireless communication apparatus 4 being stored in the address information memory 1a. When they match, the destruction unit 1g outputs the received data frame to the network 2.

Operation in FIG. 1 will be now described.

The wireless communication apparatuses 1 and 4 can perform wireless communication. Therefore, the address information memories 1a of the wireless communication apparatuses 1 and 4 store each other's address information.

The transmitted data frame receiver 1b receives a transmitted data frame from a terminal 3a to 3c. The address information converter 1c converts the address information of the terminal 3a to 3c included in the transmitted data frame, into the address information of the own apparatus 1. The radio transmitter 1d transmits by radio the transmitted data frame having the changed address information to the wireless communication apparatus 4.

The wireless communication apparatus 4 destructs the received data frame or outputs the frame to a terminal 6a to 6c, depending on the address information included in the transmitted data frame received from the wireless communication apparatus 1.

In a case where the wireless communication apparatus 4 transmits a data frame output from a terminal 6a to 6c to a terminal 3a to 3c, on the other hand, this apparatus 4 converts the address information of the terminal 6a to 6c included in the data frame into the address information of the own apparatus 4.

The radio receiver 1e of the wireless communication apparatus 1 receives a radio signal from the wireless communication apparatus 4. The address information comparator 1f compares the address information of the wireless communication apparatus 4 included in the received data frame of the radio signal, with the address information being stored in the address information memory 1a. When the comparison result does not show matching, the received data frame destruction unit 1g destructs the received data frame. When the comparison result shows matching, the received data frame destruction unit 1g outputs the received data frame to the network 2.

As described above, by storing the address information of other wireless communication apparatuses 4 with which communication can be established, the wireless communication apparatus 1 can destruct received data frames from third parties of which the address information the apparatus 1 does not store. This can avoid access from the third parties, resulting in preventing data leakage in wireless communication.

Now a case where a wireless communication apparatus of this invention is implemented as an access point in a wireless LAN will be described with reference to FIG. 2.

Figure 2:
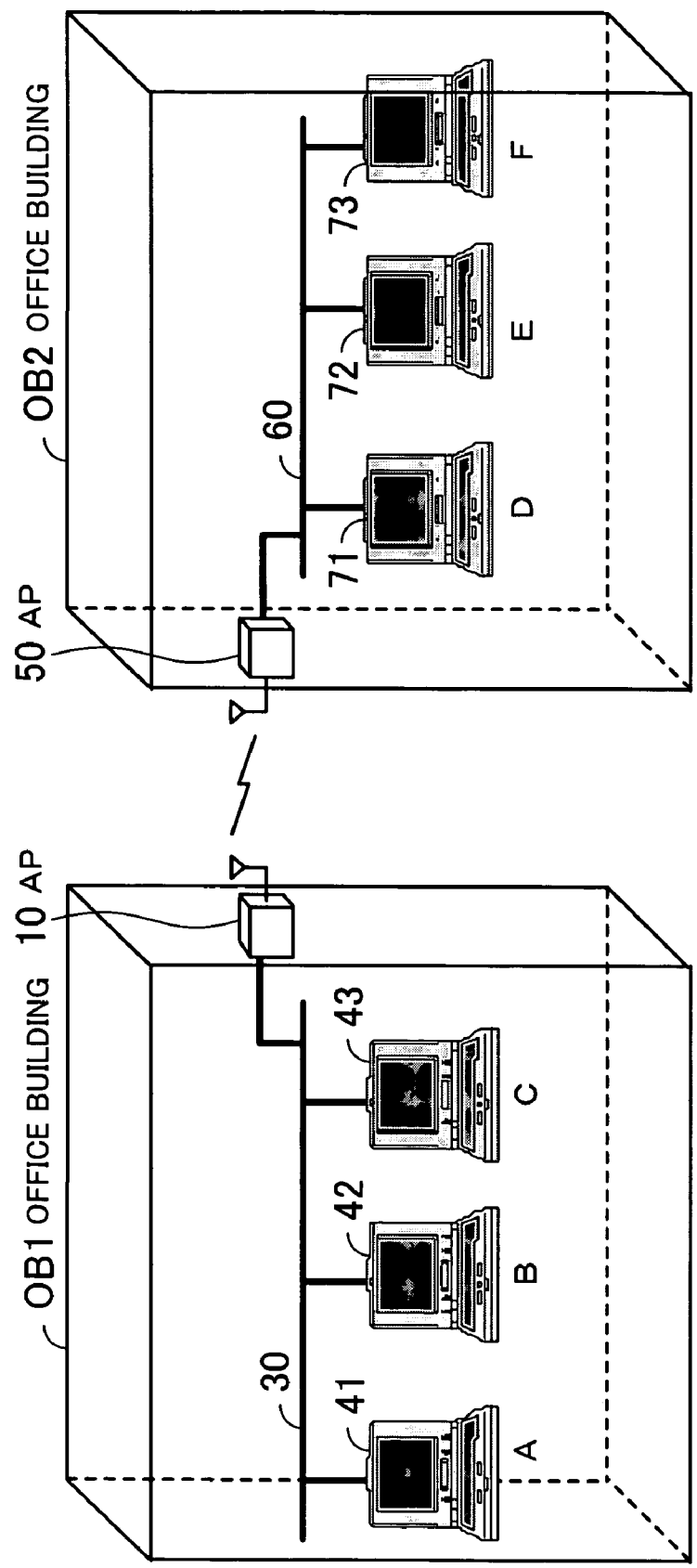
FIG. 2 shows an example of how to implement a wireless communication apparatus of the present invention as an access point (AP)

As shown in FIG. 2, terminals in each off ice building OB1, OB2 can communicate with each other through a wired LAN system. Further, because of access points (AP) on the wired LAN systems, the terminals of the office buildings OB1 and OB2 can access each other via the Aps.

In the office building OB1, the AP 10 and the terminals 41 to 43 are connected to each other with a LAN cable 30. Similarly, in the office building OB2, the AP 50 and the terminals 71 to 73 are connected to each other with a LAN cable 60. The terminals 41 to 43 and 71 to 73 are personal computers, for example, and are assigned numbers A to F, respectively.

When a terminal 41 to 43 of the office building OB1 transmits data to a terminal 71 to 73 of the off ice building OB2, the terminal 41 to 43 outputs the data to the AP10 through the LAN cable 30. The AP10 converts the received data into a radio signal and transmits it to the AP 50. The AP 50 outputs the received radio signal to the terminal 71 to 73 through the LAN cable 60. Similarly, data output from a terminal 71 to 73 of the office building OB2 is transmitted to a terminal 41 to 43 of the office building OB1.

The wireless communication between the APs 10 and 50 is at risk of being intercepted and decoded by third parties. Therefore, the APs 10 and 50 accept only radio data from the APs 50 and 10. In addition, the APs 10 and 50 conceal information on the terminals 41 to 43 and 71 to 73 in the wireless communication. This can avoid access from the third parties and also prevent data leakage in the wireless communication between the networks of the office buildings OB1 and OB2.

With the above configuration, a system where three or more wired LANs are linked can prevent data leakage in wireless communication as well.

Figure 3:
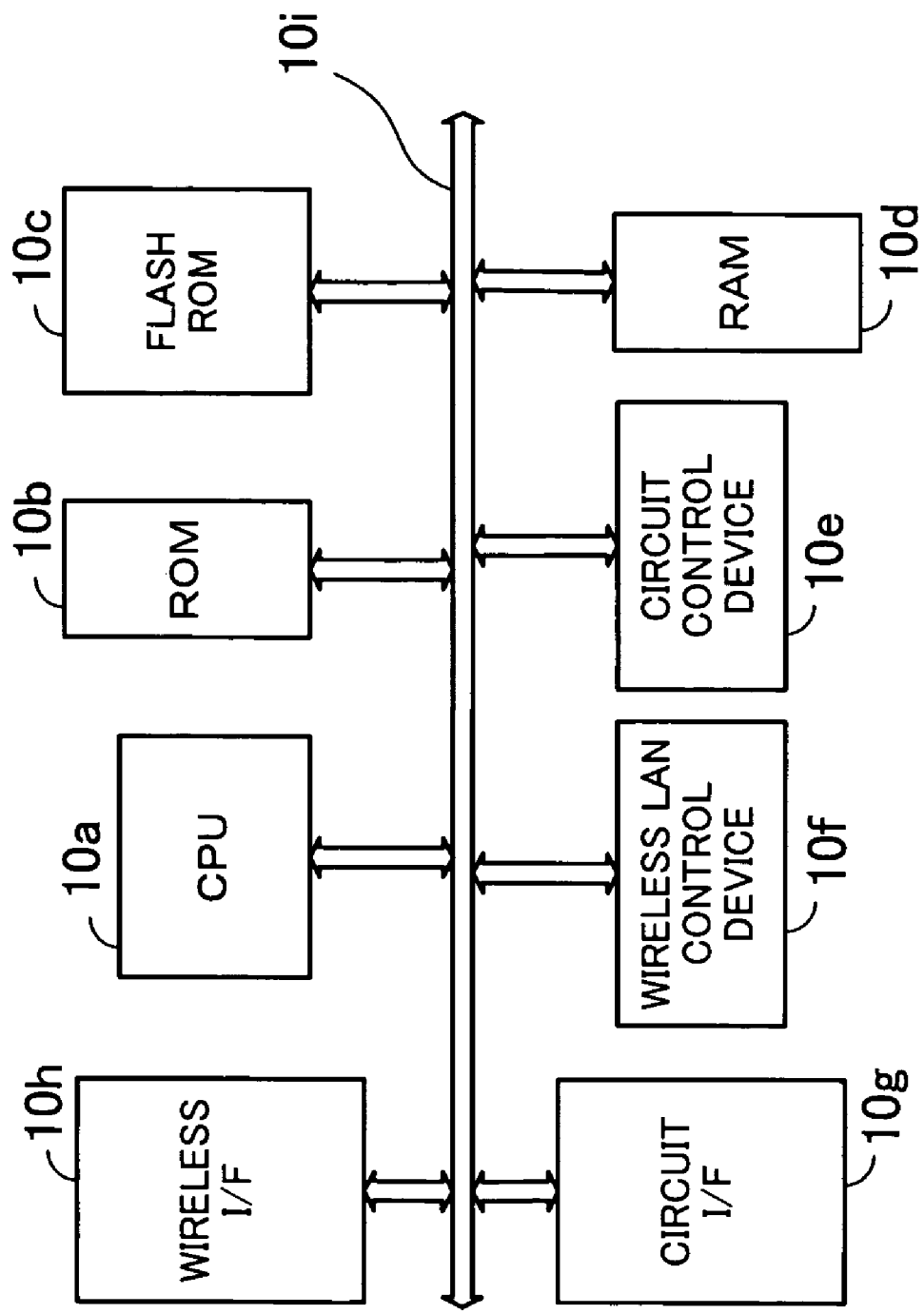
FIG. 3 shows an example of a hardware structure of the AP.

The hardware structure of the AP 10 will be now described with reference to FIG. 3.

The AP 10 shown is entirely controlled by a central processing unit (CPU) 10a. Connected to the CPU 10a via a bus 10i are a read only memory (ROM) 10b, a flash ROM 10c, a random access memory (RAM) 10d, a circuit control device 10e, a wireless LAN control device 10f, a circuit interface (I/F) 10g and a wireless I/F 10h.

The ROM 10b stores an operating system (OS) program to be executed by the CPU 10a. The flash ROM 10c stores application programs to establish wireless communication with a wired network.

In the RAM 10d, the OS program and application programs are put. In addition, the RAM 10d stores various kinds of data which is required by the CPU 10a executing the OS program and application programs.

Under the control of the CPU 10a, the circuit control device 10e controls data communication with the terminals 41 to 43 and the wireless LAN control device 10f controls data communication with the AP 50.

The circuit I/F 10g is a circuit interface being connected to the LAN cable 30. The wireless I/F 10h is a wireless interface for transmitting/receiving radio signals.

With such hardware structure, the AP 10 can communicate by radio with the AP 50. Note that the AP-50 has the hardware structure of FIG. 3 as well.

Figure 4:
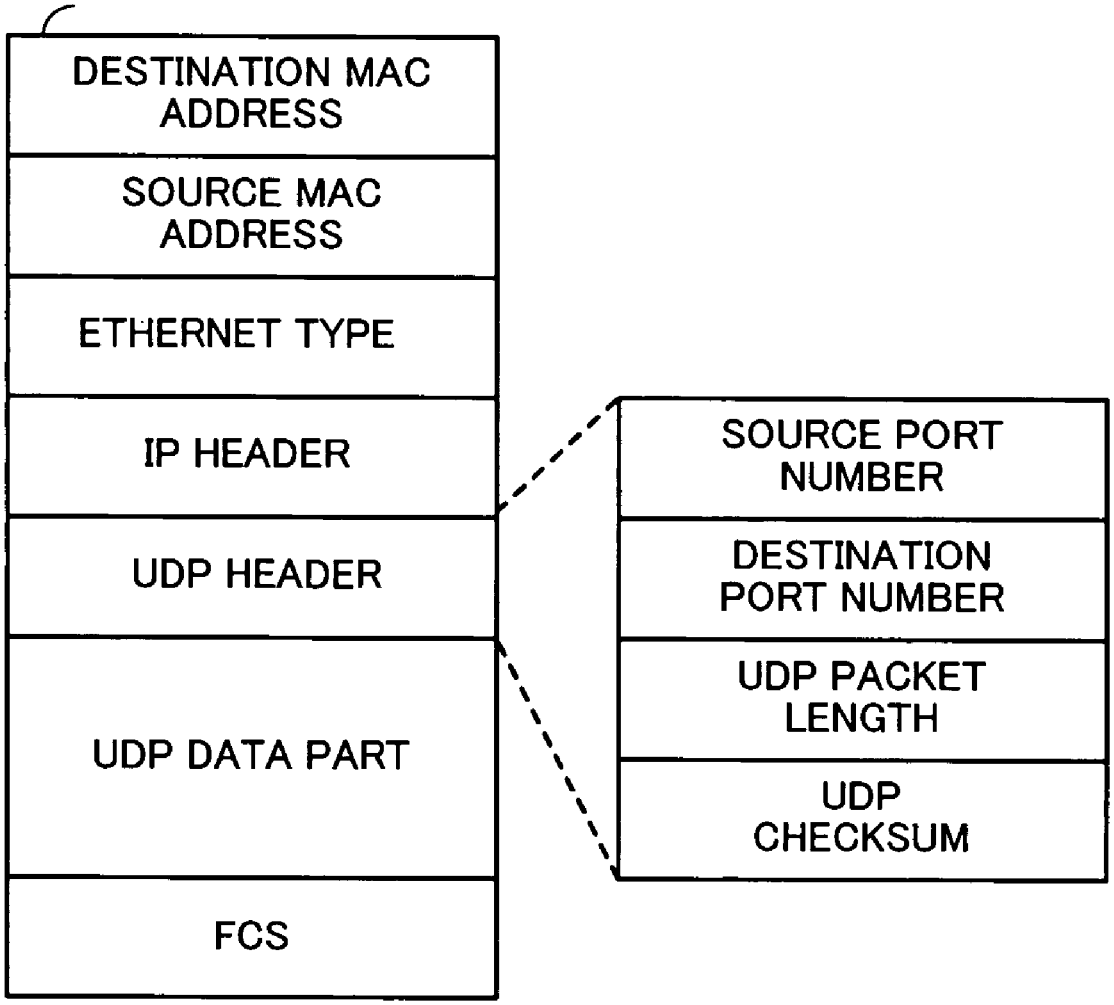
FIG. 4 is a data format of an Ethernet frame.

An Ethernet frame to be communicated between a terminal 41 to 43 and a terminal 71 to 73 will be now described with reference to FIG. 4.

The Ethernet frame 81 shown is composed of destination MAC address, source MAC address, Ehternet type, Internet Protocol (IP) header, User Datagram Protocol (UDP) header, UDP data part, and Frame Check Sequence (FCS) fields. The UDP header field is further composed of source port number, destination port number, UDP packet length, and UDP checksum subfields.

The destination MAC address field of the Ethernet frame 81 contains the MAC address of the destination terminal of data transmission. The source MAC address field contains the MAC address of the source terminal of data transmission. The Ethernet type field is used to indicate the type of following data. The IP header field contains IP header information. The UDP header filed is used to indicate the port number of the source terminal of data transmission, the port number of the destination terminal of data transmission, the packet length of the UDP, and the UDP checksum. The UDP data part field contains UDP data. The FCS field is used to contain data for detecting errors in the Ethernet frame 81.

The functions of the AP 10 will be now described with reference to FIG. 5. Since the AP 50 has the same functions as the AP 10, its explanation will be omitted.

Figure 5:
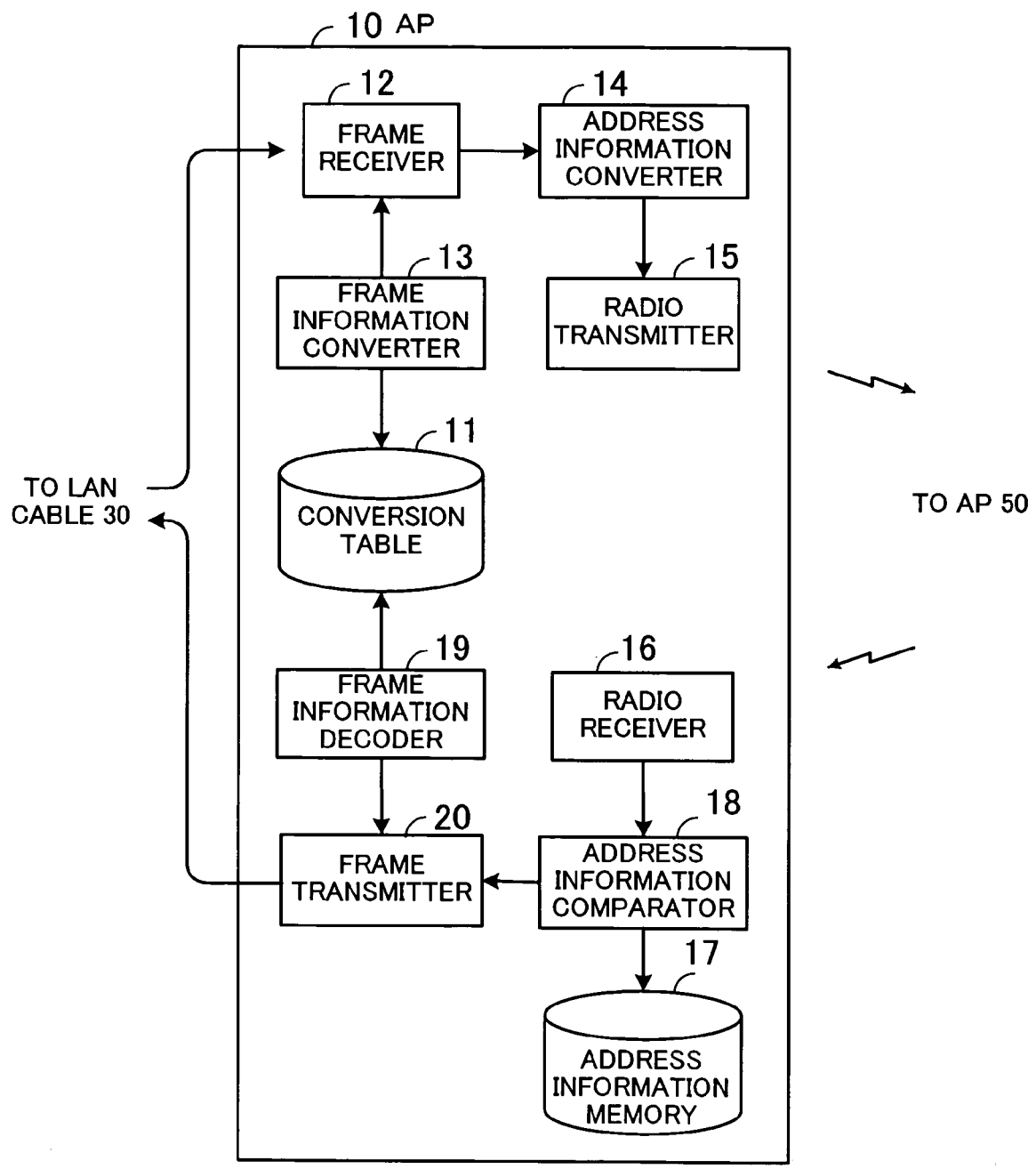
FIG. 5 is a functional block diagram of the AP.

As shown in FIG. 5, the AP 10 is composed of a conversion table 11, a frame receiver 12, a frame information converter 13, an address information converter 14, a radio transmitter 15, a radio receiver 16, an address information memory 17, an address information comparator 18, a frame information decoder 19 and a frame transmitter 20.

The conversion table 11 is a table to indicate the address information of all terminals 41 to 43 and 71 to 73 and source/destination information on sources and destinations of data frames in association with conversion information. This conversion table 11 is created in the RAM 10d shown in FIG. 3, for example.

The address information of the conversion table 11 are the MAC addresses of the terminals 41 to 43 and 71 to 73, for example. The source/destination information are the port numbers of the terminals 41 to 42 and 71 to 73, for example. The conversion information is information which indicates a combination of address information and source/destination information in a different manner. With this table 11, a port number and an MAC address can be converted into conversion information and the vice versa.

Other APs (AP 50) which can perform wireless communication with the AP 10 have the same conversion table as the conversion table 11. When the APs 10 and 50 start wireless communication, they authenticate each other. The conversion table 11 is created in the APs 10 and 50 in this authentication process. The APs 10 and 50 occasionally update the conversion table 11 when they communicate with the terminals 41 to 43 and 71 to 73, respectively.

FIG. 6 shows a structure of the conversion table 11.

As shown in this figure, the conversion table 11 consists of columns for port numbers, MAC addresses, and AP management numbers.

The port number and MAC address columns are used to indicate the port numbers and MAC addresses of all terminals 41 to 43 and 71 to 73 being connected to the wired LANs of the office buildings OB1 and OB2. The AP management number column contains conversion information (AP management numbers) corresponding to combinations of the MAC addresses and the port numbers.

PA1 and PA2 in this table 11 indicate the port numbers of the terminal 41. MAC_A indicates the MAC address of the terminal 41. PB1 and PB2, and MAC_B indicate the port numbers and the MAC address of the terminal 42. PC1 and MAC_C indicate the port number and the MAC address of the terminal 43. PD1 to PD4 and MAC_D indicate the port numbers and the MAC address of the terminal 71. PE1 and PE2, and MAC_E indicate the port numbers and the MAC address of the terminal 72. PF1 and MAC_F indicate the port number and the MAC address of the terminal 73.

In this example, with this conversion table 11, the port number PA1 and the MAC address MAC_A of the terminal 41 are converted into an AP management number pa1. Similarly, the port number PA2 and the MAC address MAC_A of the terminal 41 are converted into an AP management number pa2. The port number PF1 and the MAC address MAC_F of the terminal 73 are converted into an AP management number pf1.

Conversely, with this conversion table 11, an AP management number pb1 is converted into the MAC address MAC_B and the port number PB1. Similarly, an AP management number pb2 is converted into the MAC address MAC_B and the port number PB2.

Referring back to FIG. 5, the frame receiver 12 receives a transmitted data frame (Ethernet frame 81) from a terminal 41 to 43 through the LAN cable 30.

The frame information converter 13 converts the destination port number and the source port number included in the transmitted data frame, which has been received by the frame receiver 12, to AP management numbers by reference to the conversion table 11. The frame receiver 12 outputs the transmitted data frame, which has been changed by the frame information converter 13, to the address information converter 14.

The address information converter 14 converts the MAC address of the source terminal 41 to 43 included as the source MAC address in the transmitted data frame, into the MAC address of the own AP 10. In addition, the address information converter 14 converts the MAC address of the destination terminal 71 to 73 included as the destination MAC address in the transmitted data frame, into the MAC address of the AP 50. Then the address information converter 14 outputs the transmitted data frame having the changed MAC addresses to the radio transmitter 15.

The radio transmitter 15 encrypts the transmitted data frame with a Wired Equivalent Privacy (WEP) key and transmits it to the AP 50 by radio.

The radio receiver 16 receives a radio signal from the AP 50. The radio receiver 16 decrypts the received data frame (Ethernet frame 81) included in the radio signal, with a WEP key. The radio receiver 16 outputs the decrypted received data frame to the address information comparator 18.

The address information memory 17 stores the address information of other APs with which wireless communication can be established. That is, the address information memory 17 stores the MAC address of the AP 50. The APs 10 and 50 authenticate each other when starting wireless communication. Each other's MAC addresses are stored in this authentication process. The address information memory 17 is the RAM 10d shown in FIG. 3, for example.

The address information comparator 18 compares the source MAC address included in the received data frame received from the radio receiver 16, with the MAC addresses being stored in the address information memory 17. When the comparison result does not show matching, that is, when the source MAC address included is not the MAC address of the AP 50, the address information comparator 18 destructs the received data frame received from the radio receiver 16. When the comparison result shows matching, that is, when the source MAC address is the MAC address of the AP 50, on the contrary, the address information comparator 18 outputs the received data frame received from the radio receiver 16, to the frame transmitter 20. In short, only received data frames from APs with wireless communication can be established are output to the frame transmitter 20.

The frame information decoder 19 decodes the AP management numbers included in the received data frame, into the port numbers of the source and destination terminals and the MAC addresses of the source and destination terminals, with reference to the conversion table 11.

By the way, since the received data frame transmitted by radio indicates the MAC addresses of the APs 10 and 50, the frame information decoder 19 returns the MAC addresses back to the obtained MAC addresses of the source and destination terminals.

The frame transmitter 20 outputs the received data frame decoded by the frame information decoder 19, to the LAN cable 30. As a result, the terminal 41 to 43 of which the MAC address and the port number are specified by the received data frame can receive the received data frame.

The operation of the AP 10 in a case where the terminal 41 transmits data to the terminal 71 will be now described with reference to FIG. 7.

First the APs 10 and 50 authenticate each other for wireless communication. At this time, the conversion table 11 is created in the APs 10 and 50. In addition, the MAC address of the AP 50 is stored in the address information memory 17 and the MAC address of the AP 10 is stored in the address information memory of the AP 50.

The frame receiver 12 of the AP 10 receives the transmitted data frame from the terminal 41.

The frame information converter 13 searchers the conversion table 11 to find whether there exist the port number and the MAC address of the terminal 41 included in the transmitted data frame (step S1). Then the frame information converter 13 converts the source port number and the destination port number included in the transmitted data frame, into AP management numbers with reference to the conversion table 11. The address information converter 14 converts the source and destination MAC addresses, which are the MAC addresses of the terminals 41 and 71, included in the transmitted data frame, into the MAC addresses of the APs 10 and 50 (step S2).

Figure 7:
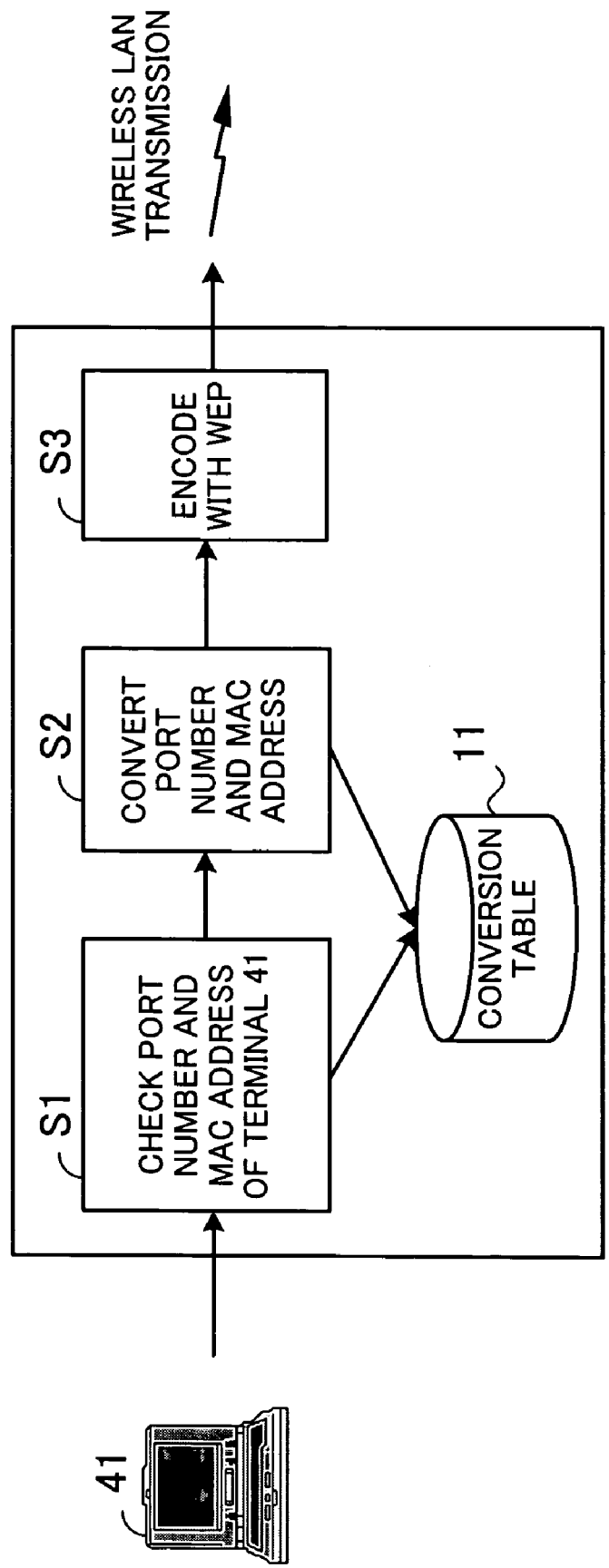
FIG. 7 is an explanatory view of AP operation in data transmission.

FIG. 8 shows port numbers and MAC addresses before and after conversion which is executed as shown in FIG. 7.

FIG. 8A shows the port numbers and MAC addresses before conversion. The source MAC address and the source port number are the MAC address MAC_A and the port number PA1 of the terminal 41 which is the transmission source of the transmitted data frame. The destination MAC address and the destination port number are the MAC address MAC_D and the port number PD1 of the terminal 71 which is the transmission destination of the transmitted data frame.

FIG. 8B shows the port numbers and MAC addresses after conversion. With the conversion table 11, the source port number and the destination port number have been converted into the AP management numbers pa1 and pd1 by the frame information converter 13. The source MAC address and the destination MAC address have been converted into the MAC addresses AP1 and AP2 of the APs 10 and 50 by the address information converter 14.

Referring back to FIG. 7, the radio transmitter 15 encrypts the transmitted data frame with a WEP key and transmits the resultant to the AP 50 by radio (step S3).

The operation of the AP 50 in a case where the terminal 71 receives data from the terminal 41 will be now described with reference to FIG. 9.

This figure shows a process to be executed by the AP 50. Note that the AP 50 has the same functions as the AP 10 as described above (refer to FIG. 5).

The radio receiver of the AP 50 receives a radio signal from the AP 10 and decrypts the received data frame of the radio signal with a WEP key (step S11).

The address information comparator compares the MAC address included in the received data frame with the MAC addresses being stored in the address information memory (step S12). Specifically, the address information comparator searches the address information memory to find whether the MAC address included in the received data frame is the MAC address of the AP 10 with which wireless communication can be established. When the comparison result does not show matching, the address information comparator destructs the received data frame. When the comparison result shows matching, the comparator outputs the received data frame to the frame transmitter.

The frame information decoder decodes the AP management numbers included in the received data frame into the port numbers and the MAC addresses of the original source and destination terminals of the transmission, with reference to the conversion table (step S13).

Figure 9:
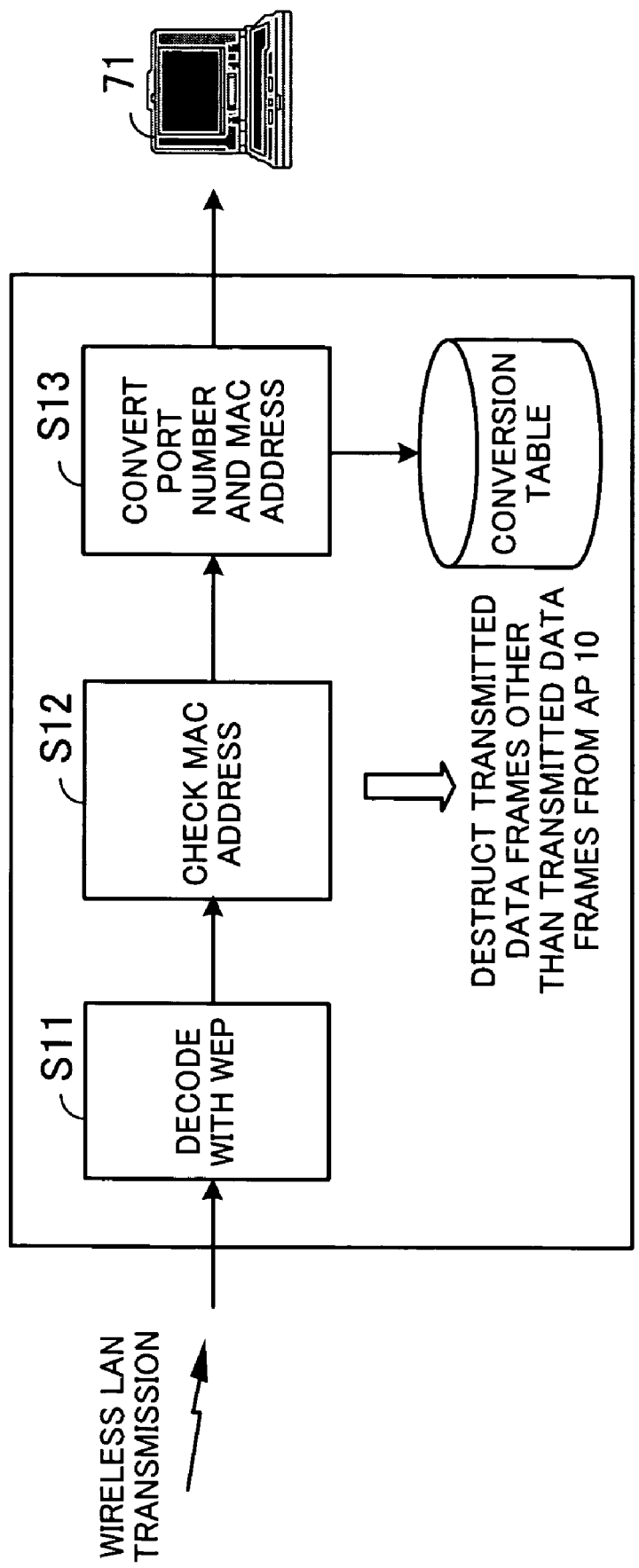
FIG. 9 is an explanatory view of AP operation in data reception.

FIG. 10 shows port numbers and MAC addresses before and after conversion which is executed as shown in FIG. 9.

FIG. 10A shows the port numbers and MAC addresses included in the received data frame transmitted by radio from the AP 10. The port numbers and MAC addresses are the same as those of FIG. 8B. That is, the source and destination port numbers are AP management numbers, and the source and destination MAC addresses are the MAC addresses of the APs 10 and 50.

FIG. 10B shows the port numbers and MAC addresses after conversion. With the conversion table 11, the source and destination port numbers are returned back to the port numbers PA1 and PD1 of the original source and destination terminals 41 and 71 by the frame information decoder 19. Similarly, with the conversion table 11, the source and destination MAC addresses are returned back to the MAC addresses MAC_A and MAC_D of the original source and destination terminals 41 and 71 by the frame information decoder 19.

The frame transmitter 20 outputs the decoded received data frame received from the frame information decoder 19, to the LAN cable 30, so that the terminal 71 can receive the received data frame according to the MAC address and the port number.

In a case where the terminal 71 returns an ACKnowledgement (ACK) data frame to the terminal 41, the AP 50 transmits it by radio after converting the MAC addresses and concealing the port numbers and MAC addresses.

As described above, the MAC addresses of APs with which wireless communication can be established are stored. Then when the MAC address of an AP sending a received data frame does not match a MAC address being stored, the received data frame is destructed. This can avoid access from third parties, resulting in preventing data leakage in wireless communication.

In addition, a received data frame is transmitted by radio after concealing the MAC address and port information of terminals by using AP management numbers. Therefore, only an AP having the same conversion table can decode the data frame. If third parties intercept the data frame transmitted by radio from an AP, they cannot obtain information on terminals being concealed. Therefore, the third parties cannot obtain information on the terminals on a wired LAN being connected to the AP, resulting in preventing data leakage in wireless communication.

In the above explanation, the MAC addresses of terminals are converted into the MAC addresses of APs and the port numbers of the terminals are converted into AP management numbers. Alternatively, the IP addresses of terminals may be converted to the IP addresses of APs and the port numbers and IP addresses may be converted into AP management numbers. This case can avoid access from third parties and conceal terminal information as well.

With the wireless communication apparatus of this invention, address information included in a received data frame received via a radio signal is compared with stored address information of other wireless communication apparatuses with which wireless communication can be established. Then the received data frame is destructed depending on the comparison result. That is, data frames transmitted to the wireless communication apparatus from third parties which are not allowed for wireless communication are destructed, resulting in avoiding access from the third parties and preventing data leakage in wireless communication.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wireless communication apparatus for connecting a plurality of wired networks with wireless communication, comprising:
    address information storage means for storing address information of other wireless communication apparatuses with which wireless communication can be established;
    transmitted data frame reception means for receiving a transmitted data frame from a terminal on one of the plurality of wired networks being linked by a wired connection;
    address information conversion means for converting address information of said terminal included in the transmitted data frame, into address information of said wireless communication apparatus;
    radio transmission means for transmitting the transmitted data frame by radio;
    radio reception means for receiving a radio signal from one of said other wireless communication apparatuses;
    address information comparison means for comparing address information of said one of said other wireless communication apparatuses included in a received data frame of the radio signal, with the address information stored in said address information storage means; and
    received data frame destruction means for destructing the received data frame depending on a comparison result of said address information comparison means.

2. The wireless communication apparatus according to claim 1, further comprising:
    a conversion table for storing address information of all terminals on said plurality of wired networks and source/destination information on sources and destinations of data transmission in association with the conversion information;
    the information conversion means for converting source/destination information included in the transmitted data frame into the conversion information with reference to said conversion table;
    destination terminal address information conversion means for converting address information of a destination terminal included in the transmitted data frame into the address information of one of said other wireless communication apparatuses; and
    decoding means for decoding the conversion information included in the received data frame into the address information and the source/destination information of said terminal and said destination terminal.

3. The wireless communication apparatus according to claim 2, wherein the source/destination information are port numbers.

4. The wireless communication apparatus according to claim 1, wherein said received data frame destruction means destructs the received data frame when the address information of said one of said other wireless communication apparatuses does not match the address information being stored in said address information storage means.

5. The wireless communication apparatus according to claim 1, wherein the address information are Media Access Control (MAC) addresses.

6. The wireless communication apparatus according to claim 1, wherein the address information are Internet Protocol (IP) addresses.

* * * * *